(12) United States Patent
Hinds (10) Patent No.: US 8,417,045 B2
(45) Date of Patent: Apr. 9, 2013

(54) MECHANISM FOR PROCESSING ORDER-16 DISCRETE COSINE TRANSFORMS

(75) Inventor: Arianne Therese Hinds, Louisville, CO (US)

(73) Assignee: InfoPrint Solutions Company LLC, Boulder, CO (US)

(*) Notice: Subject to any disclaimer, the term of this patent is extended or adjusted under 35 U.S.C. 154(b) by 362 days.

(21) Appl. No.: 12/846,502

(22) Filed: Jul. 29, 2010

(65) Prior Publication Data
US 2012/0027318 A1 Feb. 2, 2012

(51) Int. Cl.
*G06K 9/36* (2006.01)
(52) U.S. Cl.
USPC ............... 382/250; 382/232; 382/244
(58) Field of Classification Search ............ 382/232, 382/236, 240, 244, 250; 348/193; 375/E7.03, 375/E7.093; 708/203, 401, 402
See application file for complete search history.

(56) References Cited

U.S. PATENT DOCUMENTS

| | | | | |
|---|---|---|---|---|
| 5,483,475 A * | 1/1996 | Kao | ............... | 708/401 |
| 5,546,336 A * | 8/1996 | Pechanek et al. | ............. | 708/402 |
| 5,623,423 A * | 4/1997 | Lipovski | ............ | 708/203 |
| 5,825,929 A * | 10/1998 | Chen et al. | ............ | 382/236 |
| 6,587,590 B1 * | 7/2003 | Pan | ............... | 382/250 |
| 7,007,054 B1 | 2/2006 | Brady et al. | | |
| 7,230,560 B2 | 6/2007 | Lee et al. | | |
| 7,403,665 B2 * | 7/2008 | Zhang | ............ | 382/244 |
| 7,421,139 B2 | 9/2008 | Hinds et al. | | |
| 7,430,332 B2 | 9/2008 | Mitchell et al. | | |
| 7,444,033 B2 | 10/2008 | Jiang et al. | | |
| 2006/0080374 A1 | 4/2006 | Mitchell et al. | | |
| 2006/0294173 A1 | 12/2006 | Hallapuro et al. | | |
| 2007/0271321 A1 | 11/2007 | Reznik et al. | | |
| 2009/0112958 A1 | 4/2009 | Cham et al. | | |
| 2009/0157785 A1 | 6/2009 | Reznik et al. | | |

OTHER PUBLICATIONS

Jeong, Yeonsik, "Fast Discrete Cosine Transform Structure Suitable for Implementation with Integer Computation", (Oct. 2000), 2672-2676.
Liang, Jie, "Fast Multiplierless Approximations of the DCT With the Lifting Scheme", *IEEE 1053-587X/01*, (2001), 3032-3044.
Loeffler, Christoph, et al., "Practical Fast 1-D DCT Algorithms with 11 Multiplications", *IEEE CH2673-2/89/0000-0988*, (1989), 988-991.

* cited by examiner

*Primary Examiner* — Anh Hong Do
(74) *Attorney, Agent, or Firm* — Blakely, Sokoloff, Taylor & Zafman LLP (57) ABSTRACT

A computer generated method is disclosed. The method includes receiving data values and performing a 1-D 16×16 discrete cosine transform (DCT) on the data values by replacing each irrational constant used in multiplication operations with a rational dyadic constant that approximates the irrational constant. The output of the DCT is then scaled by a set of scale factors that refine the precision of the approximations used for the 16×16 DCT.

23 Claims, 6 Drawing Sheets

| symbol | equations |
|---|---|
| $I_0 \longrightarrow \bullet\, O_0$ <br> $I_1 \longrightarrow \bullet\, O_1$ | $O_0 = I_0 + I_1$ <br> $O_1 = I_0 - I_1$ |
| $I_0 \longrightarrow \boxed{kcn} \longrightarrow O_0$ <br> $I_1 \longrightarrow \phantom{\boxed{kcn}} \longrightarrow O_1$ | $O_1 = I_0 \cdot k \cdot \cos\frac{n\pi}{2N} + I_1 \cdot k \cdot \sin\frac{n\pi}{2N}$ <br> $O_1 = -I_0 \cdot k \cdot \sin\frac{n\pi}{2N} + I_1 \cdot k \cdot \cos\frac{n\pi}{2N}$ |
| $I \longrightarrow \bigcirc \longrightarrow O$ | $O = \sqrt{2} \cdot I$ |

Low Complexity

High Precision

MECHANISM FOR PROCESSING ORDER-16 DISCRETE COSINE TRANSFORMS

FIELD OF THE INVENTION

The invention relates to the processing of transforms, and in particular, to the improved processing of order 16 Discrete Cosine Transforms.

BACKGROUND

Transforms, which take data from one domain (e.g., sampled data) to another (e.g., frequency space), are used in many signal and/or image processing applications. Such transforms are used for a variety of applications, including, but not limited to data analysis, feature identification and/or extraction, signal correlation, data compression, or data embedding. Many of these transforms require efficient implementation for real-time and/or fast execution whether or not compression is used as part of the data processing.

Signal and image processing frequently require converting input data into transform coefficients for the purposes of analysis. Often only a quantized version of the coefficients is needed (e.g. JPEG/MPEG data compression or audio/voice compression). Many such applications need to be processed in real time such as the generation of JPEG data for high speed printers.

The discrete cosine transform (DCT) is a widely used transform for image processing. With DCT coding, images are decomposed using a forward DCT (FDCT) and reconstructed using an inverse DCT (IDCT). The 16×16 DCT can be especially effective to decorrelate high-definition image and video signals, and is currently being considered in the development of the High Efficiency Video Coding project being developed by the Joint Collaboration Team—Video Coding in both the ITU-T Study Group 16 and ISO/IEC/JCT1/SC29/WG11.

Scaled architectures have previously been shown as an effective mechanism for reducing the complexity of the transform implementations. However, implementations for scaled architectures are more easily realized for 4×4 and 8×8 DCTs because of the inherent difficulty of finding scaling terms for the larger sets of simultaneous constants (e.g., the set of constants required to compute a set of concurrent rotations) more common in larger transforms (i.e. 16×16, 32×32, etc. . . . ).

For example, in Practical fast 1-D DCT algorithms with 11 multiplications, by C. Loeffler, A. Ligtenberg, and G. S. Moschytz, (Proc. IEEE Int. Conf. Accoust., Speech, and Sig. Proc. (ICASSP'89), vol. 2, pp. 988-991, February 1989), a factorization for a 1-D 16×16 DCT is presented that may be implemented with 31 multiplications and 81 additions. In this example, four rotations by four unique angles must be performed in the second stage of the transform, which require eight unique irrational constants.

These computations are difficult to implement in a scaled architecture given that a single common factor must be found for the entire set of constants without overly compromising the precision of the approximations. A common solution to this problem is to forgo the scaled approach entirely for this set of constraints since it is difficult to implement the 16×16 DCT in a scaled architecture.

Therefore, a scaled architecture that provides common factors for some or all of the irrational factors of the 16×16 DCT is desired.

SUMMARY

In one embodiment, a computer generated method is disclosed. The method includes receiving data values and performing a 1-D 16×16 discrete cosine transform (DCT) on the data values by replacing each irrational constant used in multiplication operations with a rational dyadic constant that approximates the irrational constant. The output of the DCT is then scaled by a set of scale factors that refine the precision of the approximations used for the 16×16 DCT.

In a further embodiment, a data compression system includes a transformer to receive data values and perform a 1-D 16×16 discrete cosine transform (DCT) on the data values by replacing each irrational constant used in multiplication operations with a rational dyadic constant that approximates the irrational constant.

BRIEF DESCRIPTION OF THE DRAWINGS

A better understanding of the present invention can be obtained from the following detailed description in conjunction with the following drawings, in which:

FIGS. 4A and 4B illustrate the fixed-point scaling matrices for two embodiments of a scaled 2-D 16×16 DCT;

DETAILED DESCRIPTION

A 16×16 DCT scaled architecture is described. The 16×16 DCT scaled architecture includes the selection of floating point values to serve as elements of a diagonal scaling matrix to improve precision of approximations used in a first simplified transform matrix, and the selection of the approximations used in the first simplified transform matrix. Each of the elements of the diagonal scaling matrix are computed by identifying the common factors used to scale each of the sets of simultaneous constants in the 16×16 DCT. In a further embodiment, the common factor corresponding to approximations used for a specific group of simultaneous constants may also be adjusted by a power of two so long as the corresponding approximation in the first simplified transform matrix is likewise adjusted by the same power of two.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
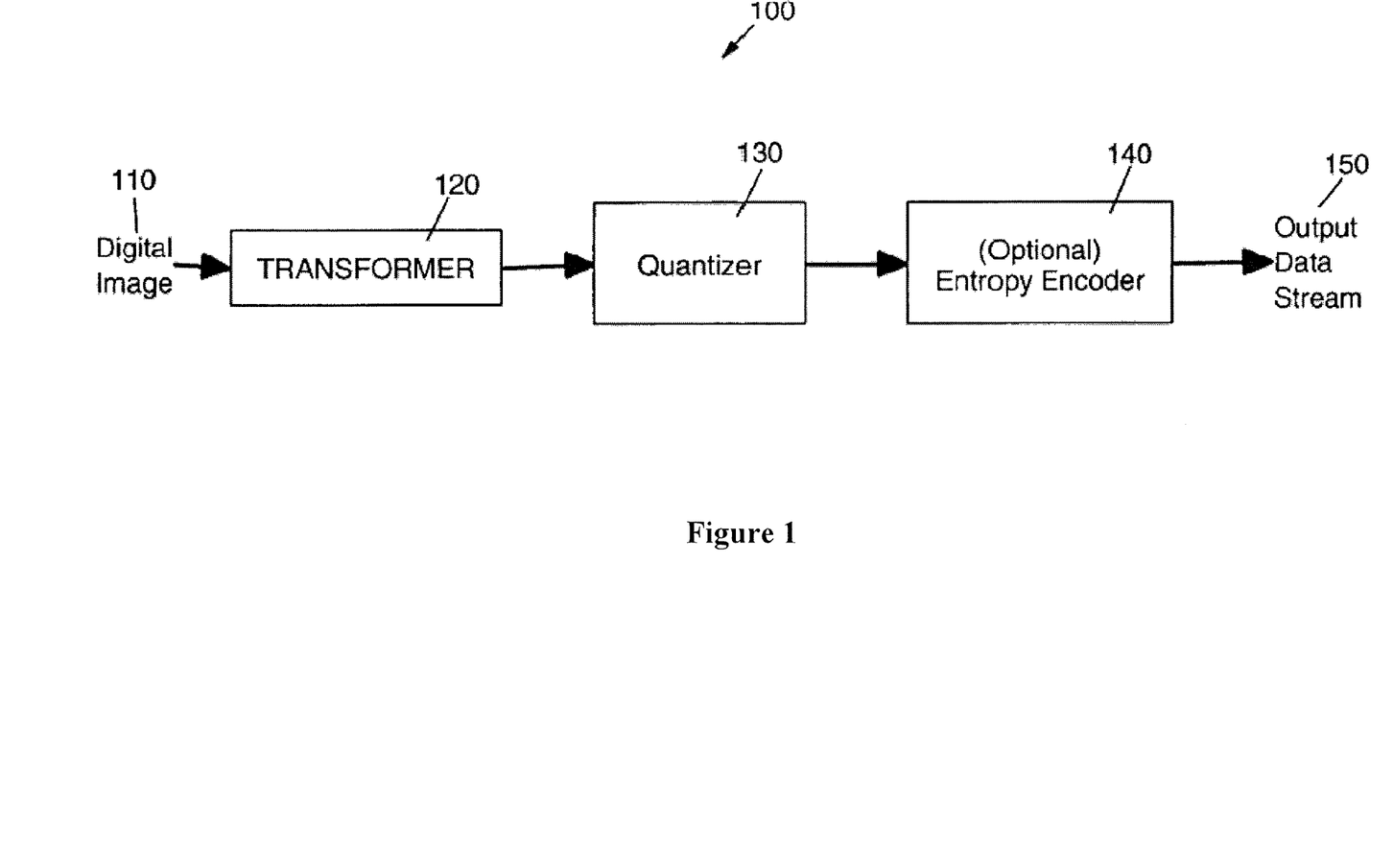
FIG. 1 illustrates one embodiment of an image compression system.

FIG. 1 illustrates one embodiment of a compression system 100. Image compression system 100 includes transformer 120, quantizer 130 and entropy encoder 140. Compression is accomplished by applying a linear transform to decorrelate image data 110, quantizing the resulting transform coefficients, and, if desired, entropy coding the quantized values.

Quantizer 130 reduces the number of bits needed to store the transformed coefficients by reducing the precision of those values. Since this is a many-to-one mapping, it is a lossy process and is a significant source of compression in an encoder. Quantization can be performed on each individual coefficient, which is known as Scalar Quantization (SQ). Quantization can also be performed on a collection of coefficients together, and this is known as Vector Quantization (VQ). Both uniform and non-uniform quantizers can be used depending on the problem at hand.

Entropy encoder 140 further compresses the quantized values losslessly to give better overall compression. It uses a model to accurately determine the probabilities for each quantized value and produces an appropriate code based on these probabilities so that the resultant output code stream will be smaller than the input stream. The most commonly used entropy encoders are the Huffman encoder and the arithmetic encoder, although for applications requiring fast execution, simple run-length encoding (RLE) has proven very effective.

In one embodiment, transformer 120 is a 1-D DCT used to decompose a set of 16 grey-scale samples to their underlying spatial frequencies. Further a 1-D DCT can be extended to apply to 2-D images that require a 16×16 array of samples. 2-D images are processed by multiplying a horizontally oriented set of 1-D DCT functions by a vertically oriented set of the same functions, such an arrangement being a 2-D DCT. However for the purposes of describing the preferred embodiment of the present invention a 1-D DCT will be used, and a skilled person will realize that this can be considered equivalent to processing the top row of a 16×16 2-D image sample.

In a 1-D DCT transformation the set of sixteen samples are represented by values s(x) for x=0 to 15, and each is transformed using a Forward DCT (FDCT) which comprises the following equations:

$$S(u) = (C(u)/2) \sum_{x=0}^{15} s(x) \cos[(2x+1)u\Pi/32]$$

The transformed image is then reconstructed using an Inverse DCT (IDCT) which comprises the following equations:

$$s(x) = \sum_{x=0}^{15} (C(u)/2) S(u) \cos[(2x+1)u\Pi/32]$$

In which:
u=0 to 15
$C(u) = 1/\sqrt{2}$ for u=0
C(u)=1 for u>0
s(x)=value from sample
S(u)=DCT coefficient for sample values.

Figure 2A:
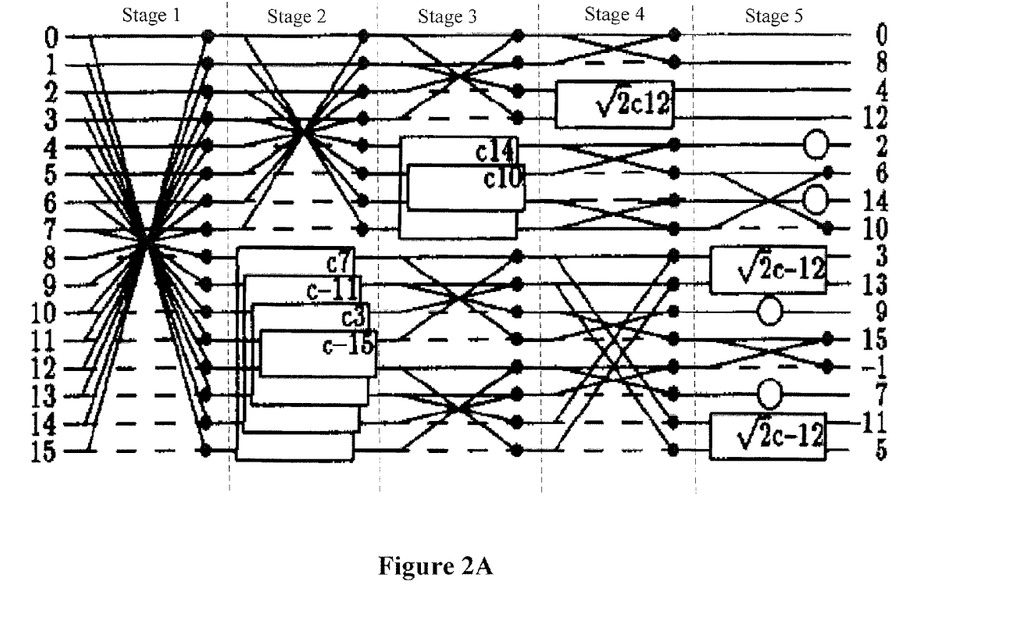
FIGS. 2A and 2B illustrate one embodiment of a 1-D 16×16 DCT architecture.
Figure 2B:
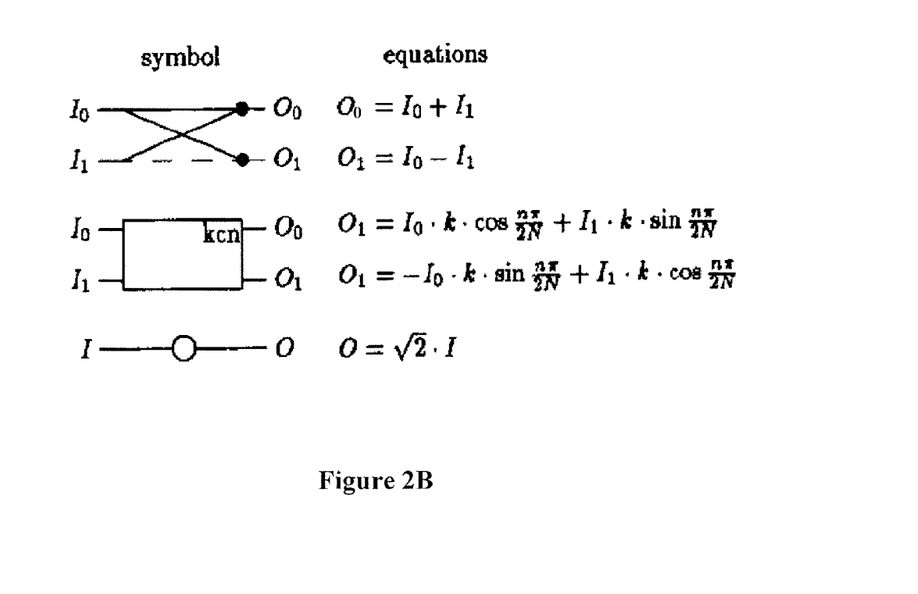

FIGS. 2A and 2B illustrate one embodiment of a 1-D 16×16 DCT architecture. FIG. 2A includes a flow graph for the architecture, while FIG. 2B shows the building blocks. Stage 1 includes a butterfly operation stage where inputs are (e.g. $I_0$ and $I_1$) are added and subtracted. In stage 1, the even coefficients of the flow are separated from the odd coefficients, where additional butterfly operations are performed at stage 2.

Also in stage 2, plane rotations are performed on intermediate variables with constants (e.g., $C_{7\pi/32}$, $C_{11\pi/32}$ and $C_{15\pi/32}$). The rotations are further performed by multiplying intermediate variables with both sine and cosine. As shown in FIG. 2B, each rotation includes 3 multiplication and 3 addition operations. The remaining stages 3-5 each include additional butterfly and rotation operations, with rotation constants $C_{14\pi/32}$ and $C_{10\pi/32}$ in stage 3 and square_root(2)* $C_{12\pi/32}$ in stages 4 and 5. Accordingly, 31 multiplications and 81 additions are processed in the 1-D 16×16 DCT scaling architecture. Note that the inverse DCT implements the same structure shown in FIG. 2A, but in reverse order. Thus, outputs become inputs and vice versa.

The constants representing the sine and cosine angles used in the multiplications are irrational constants, which are multiples of π/32 for the 16-point DCT and IDCT. An irrational constant is a constant that is not a ratio of two integers. According to one embodiment, multiplications with the irrational constants may be more efficiently performed in fixed-point integer arithmetic when each irrational constant is approximated by a rational dyadic constant or integer.

A rational dyadic constant is a rational constant with a dyadic denominator and has the form $c/2^b$, where b and c are integers and b>=0 where in the case of b=0, the rational dyadic constant is itself equivalent to an integer. Multiplication of an integer variable with a rational dyadic constant may be achieved with logical and arithmetic operations. The number of logical and arithmetic operations is dependent on the manner in which the computation is performed as well as the value of the rational dyadic constant.

In one embodiment, common factors are implemented to reduce the total number of operations for a transform and/or to improve the precision of the transform results. A common factor is a constant that is applied to one or more intermediate variables in a transform. An intermediate variable may also be referred to as a data value, etc. A common factor may be absorbed with one or more transform constants and may also be accounted for by altering one or more scale factors. A common factor may improve the approximation of one or more (irrational) transform constants by one or more rational dyadic constants, which may then result in a fewer total number of operations and/or improved precision.

In general, any number of common factors may be used for a transform, and each common factor may be applied to any number of intermediate variables in the transform. In one embodiment, multiple common factors are used for a transform and are applied to multiple groups of intermediate variables of different sizes. In another embodiment, multiple common factors are applied to multiple groups of intermediate variables of the same size.

Figure 3:
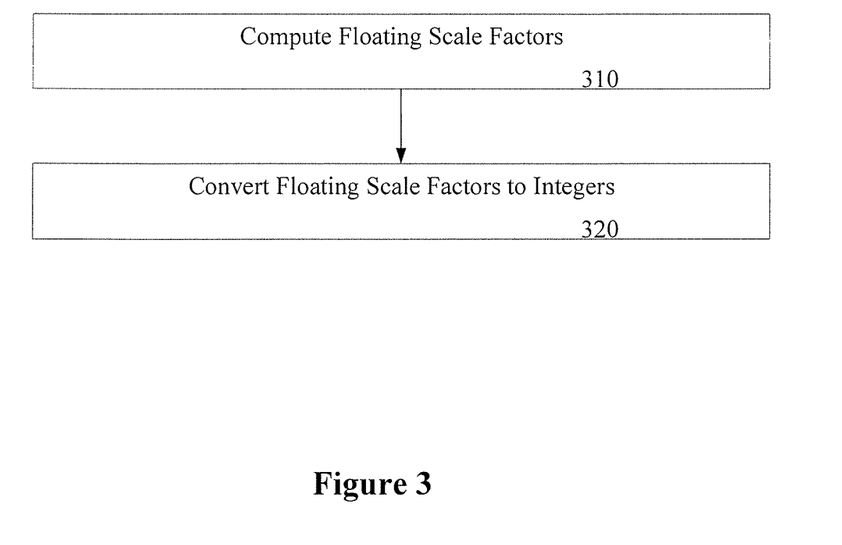
FIG. 3 is a flow diagram illustrating one embodiment for computing fixed-point scale factors for a 2-D 16×16 DCT.

FIG. 3 is a flow diagram illustrating one embodiment for implementing a 1-D 16×16 DCT scaling architecture using common factors for irrational constants. At processing block 310, 2-D floating point factors are computed. In one embodiment, the floating point factors are computed prior to transform processing, resulting in 256 2-D floating point scale factors for a 16×16 matrix. Table 1 illustrates one embodiment of 1-D scale factors implemented to produce 16×16 DCT Coefficients.

TABLE 1

| 16x16 DCT Coefficient | Definition of 1-D Scale Factor |
|---|---|
| sf[0] | 1.0 |
| sf[1] | 1.0 * SCALE_8 |
| sf[2] | 1.0 * sqrt_2 * SCALE_4 |

TABLE 1-continued

| 16x16 DCT Coefficient | Definition of 1-D Scale Factor |
|---|---|
| sf[3] | 1.0 * sqrt_2 * SCALE_8 * SCALE_2 |
| sf[4] | 1.0 * sqrt_2 * SCALE_2 |
| sf[5] | 1.0 * sqrt_2 * SCALE_8 * SCALE_2 |
| sf[6] | 1.0 * SCALE_4 |
| sf[7] | 1.0 * sqrt_2 * SCALE_8 |
| sf[8] | 1.0 |
| sf[9] | 1.0 * sqrt_2 * SCALE_8 |
| sf[10] | 1.0 * SCALE_4 |
| sf[11] | 1.0 * sqrt_2 * SCALE_8 * SCALE_2 |
| sf[12] | 1.0 * sqrt_2 * SCALE_2 |
| sf[13] | 1.0 * sqrt_2 * SCALE_8 * SCALE_2 |
| sf[14] | 1.0 * sqrt_2 * SCALE_4 |
| sf[15] | 1.0 * SCALE_8 |

According to one embodiment, the scaling architecture may be implemented for both low complexity and high precision. For instance, on some hardware platforms, arithmetic operations (e.g., additions) may be more complex than logical operations. Thus, reducing the number of arithmetic operations may be more important. In the extreme, computational complexity may be quantified based solely on the number of arithmetic operations, without taking into account logical operations.

On other hardware platforms, logical operations (e.g., shifts) may be more expensive, and reducing the number of logical operations (e.g., reducing the number of shift operations and/or the total number of bits shifted) may be more important. In general, a weighted average number of logical and arithmetic operations may be used, where the weights may represent the relative complexities of the logical and arithmetic operations.

In one embodiment, a high-precision embodiment is provided in instances where there are sufficient computational resources available for high-precision implementations (e.g., there are enough computational resources available to do this in a high precision manner). An exemplary high-precision application may be implemented at a high definition television or cable set-top box.

In the low-complexity embodiment, precision is compromised in exchange for implementations that do not require a non-trivial amount of arithmetic operations. For example, a low-complexity embodiment would be implemented at a hand-held device, such as a smart phone.

Table 2 shows the common scale factor values (e.g., SCALE_8, SCALE_4 and SCALE_2) used in Table 1 for low complexity and high precision embodiments. In one embodiment, the low complexity embodiment is computed with 10 bits of precision, while the high precision embodiment is computed with 11 bits of precision. In other embodiments, any number (N) of bits may be used to convert the floating scale factors into fixed-point scale factors as long as N+4 (for a 16x16 DCT) bits are shifted out of the final scaled outputs.

TABLE 2

| Scale Factor | Low Complexity | High Precision |
|---|---|---|
| SCALE_8 | (0.0318256099610648 * 16.0) | (0.0034505624833603 * 64.0) |
| SCALE_4 | (0.0691691530588235 * 16.0) | (0.0061209382988048 * 64.0) |
| SCALE_2 | (0.1866518520730000 * 8.0) | (0.0115625041107168 * 16.0) |

At processing block 320, each of the 256 floating point scale factors are converted into integers. In the high-precision embodiment, the conversion is performed by multiplying the results of processing block 310 by 2^11 (or 2048). In the low-complexity embodiment, the conversion is performed by multiplying the results of processing block 310 by 2^10 (or 1024).

FIGS. 4A and 4B illustrate the resulting 16×16 2-D scaling matrix for the low complexity and high precision embodiments, respectively. In the low-complexity embodiment, the irrational constants are approximated in the first-simplified transform matrix by substituting each multiplication operation with no more than one addition operation.

In the high precision embodiment, the approximations in the first simplified transform are more precise and hence more complex. Accordingly, approximations in the high precision embodiment may require more than one addition operation for each of the approximations, resulting in a transform implementation that more precisely approximates a 16×16 DCT.

Once the floating point scale factors are converted into integers, a 2-D algorithm is implemented. In one embodiment, the 2-D algorithm includes: 1. executing the above-described 1-D 16×16 DCT flowgraph for each of the rows of the 16×16 input sample matrix; and 2. executing the flowgraph for each of the columns of the 16×16 outputs from step 1.

In other embodiments, steps 1 and 2 may be interchanged since the 1-D 16×16 DCT can be performed first for the columns, and then for the rows. Thus, a multitude of butterfly and rotation operations are performed similarly to that described above with regard to the FIG. 2A flow graph. As discussed above, the irrational constants in each of the rotation operations are replaced by a rational dyadic constant.

Tables 3-5 illustrate the rational dyadic constant integer approximations implemented in a low complexity embodiment for each of the rotation stages in the scaling architecture. The tables also include a repeat of reference the matrix scaling factors used in multiplication with the constants. Similarly, Tables 6-8 illustrate the rational dyadic constant integer approximations for a high precision embodiment.

The symbol >>4 and >>6 in the tables represent bitwise shift-right operation by the respective number of bits. For example, >>4 is the equivalent of dividing by 16 (e.g., shifting the bits of the integer to the right by 4 bits), while >>6 is the equivalent of dividing by 64. Note that in Table 3 and Table 6 the scale factors are multiplied by 16 and 64, respectively.

However in other embodiments these approximations may implement using any power of two, depending on the complexity allowed by the processor. For instance, all of the integer approximations could be shifted by >>3, and *16.0 could be substituted with *8.0 to adjust the scale factors. Thus, the balance between the approximation and the scale factor has to be maintained.

TABLE 3

| Irrational Constants used in Stage 2 rotations | Integer Approximation | number of addition operations for integer approximation | 1-D Scale Factor to be used in scaling matrix SCALE_8 |
|---|---|---|---|
| cos(7 π/32) | 24 >> 4 | 1 | (0.0318256099610648 * 16.0) |
| sin(7 π/32) | 20 >> 4 | 1 | (0.0318256099610648 * 16.0) |
| cos(11 π/32) | 15 >> 4 | 1 | (0.0318256099610648 * 16.0) |
| sin(11 π/32) | 28 >> 4 | 1 | (0.0318256099610648 * 16.0) |

TABLE 3-continued

| Irrational Constants used in Stage 2 rotations | Integer Approximation | number of addition operations for integer approximation | 1-D Scale Factor to be used in scaling matrix SCALE_8 |
|---|---|---|---|
| cos(3 π/32) | 30 >> 4 | 1 | (0.0318256099610648 * 16.0) |
| sin(3 π/32) | 9 >> 4 | 1 | (0.0318256099610648 * 16.0) |
| cos(15 π/32) | 3 >> 4 | 1 | (0.0318256099610648 * 16.0) |
| sin(15 π/32) | 31 >> 4 | 1 | (0.0318256099610648 * 16.0) |

TABLE 4

| Irrational Constants used in Stage 3 rotations | Integer Approximation | number of addition operations for integer approximation | 1-D Scale Factor to be used in scaling matrix SCALE_4 |
|---|---|---|---|
| cos(14 π/32) | 3 >> 4 | 1 | (0.0691691530588235 * 16.0) |
| sin(14 π/32) | 14 >> 4 | 1 | (0.0691691530588235 * 16.0) |
| cos(10 π/32) | 8 >> 4 | 0 | (0.0691691530588235 * 16.0) |
| sin(10 π/32) | 12 >> 4 | 1 | (0.0691691530588235 * 16.0) |

TABLE 5

| Irrational Constants used in Stage 4 and Stage 5 rotations | Integer Approximation | number of addition operations for integer approximation | 1-D Scale Factor to be used in scaling matrix SCALE_2 |
|---|---|---|---|
| cos(12 π/32) | 2 >> 3 | 0 | ((0.1866518520730000 * 8.0) |
| sin(12 π/32) | 5 >> 3 | 1 | (0.1866518520730000 * 8.0) |

TABLE 6

| Irrational Constants used in Stage 2 rotations | Integer Approximation | number of addition operations for integer approximation | 1-D Scale Factor to be used in scaling matrix SCALE_8 |
|---|---|---|---|
| cos(7 π/32) | 224 >> 6 | 1 | (0.0034505624833603 * 64.0) |
| sin(7 π/32) | 184 >> 6 | 2 | (0.0034505624833603 * 64.0) |
| cos(11 π/32) | 137 >> 6 | 2 | (0.0034505624833603 * 64.0) |
| sin(11 π/32) | 256 >> 6 | 0 | (0.0034505624833603 * 64.0) |
| cos(3 π/32) | 277 >> 6 | 3 | (0.0034505624833603 * 64.0) |
| sin(3 π/32) | 84 >> 6 | 2 | (0.0034505624833603 * 64.0) |
| cos(15 π/32) | 28 >> 6 | 1 | (0.0034505624833603 * 64.0) |
| sin(15 π/32) | 288 >> 6 | 1 | (0.0034505624833603 * 64.0) |

TABLE 7

| Irrational Constants used in Stage 3 rotations | Integer Approximation | number of addition operations for integer approximation | 1-D Scale Factor to be used in scaling matrix SCALE_4 |
|---|---|---|---|
| cos(14 π/32) | 32 >> 6 | 0 | (0.0061209382988048 * 64.0) |
| sin(14 π/32) | 160 >> 6 | 1 | (0.0061209382988048 * 64.0) |
| cos(10 π/32) | 96 >> 6 | 3 | (0.0061209382988048 * 64.0) |
| sin(10 π/32) | 136 >> 6 | 1 | (0.0061209382988048 * 64.0) |

TABLE 8

| Irrational Constants used in Stage 4 and Stage 5 rotations | Integer Approximation | number of addition operations for integer approximation | 1-D Scale Factor to be used in scaling matrix SCALE_2 |
|---|---|---|---|
| cos(12 π/32) | 33 >> 4 | 1 | (0.0115625041107168 * 16.0) |
| sin(12 π/32) | 80 >> 4 | 1 | (0.0115625041107168 * 16.0) |

As shown in Table 1, the square root of 2 factor multiplied in stages 4 and 5 are moved into the scaling matrix. Because these multiplications are moved from the main transform into the scaling matrix, the total number of multiplications needed for a 1-D transform is, reduced to 27. Similarly, the square root of 2 factor required for the rotations in Stages 4 and 5 are also moved into the scaling matrix shown in Table 1. As a result, the irrational constants for the rotations in Stages 4 and 5 become cosine and sine of 12π/32.

According to a further embodiment, a hybrid-scaled architecture may be implemented where scaling is applied only to a smaller number of simultaneous irrational values constants. In such a hybrid-scaled architecture, the remaining constants (e.g., the set including eight unique constants in the 16×16 DCT) may be approximated independently using dyadic rationals or integers. That is, some of the approximations in the first simplified transform matrix are scaled by the second scaling matrix, and some of the approximations in the first simplified transform matrix are not scaled in the second scaling matrix.

Figure 5:
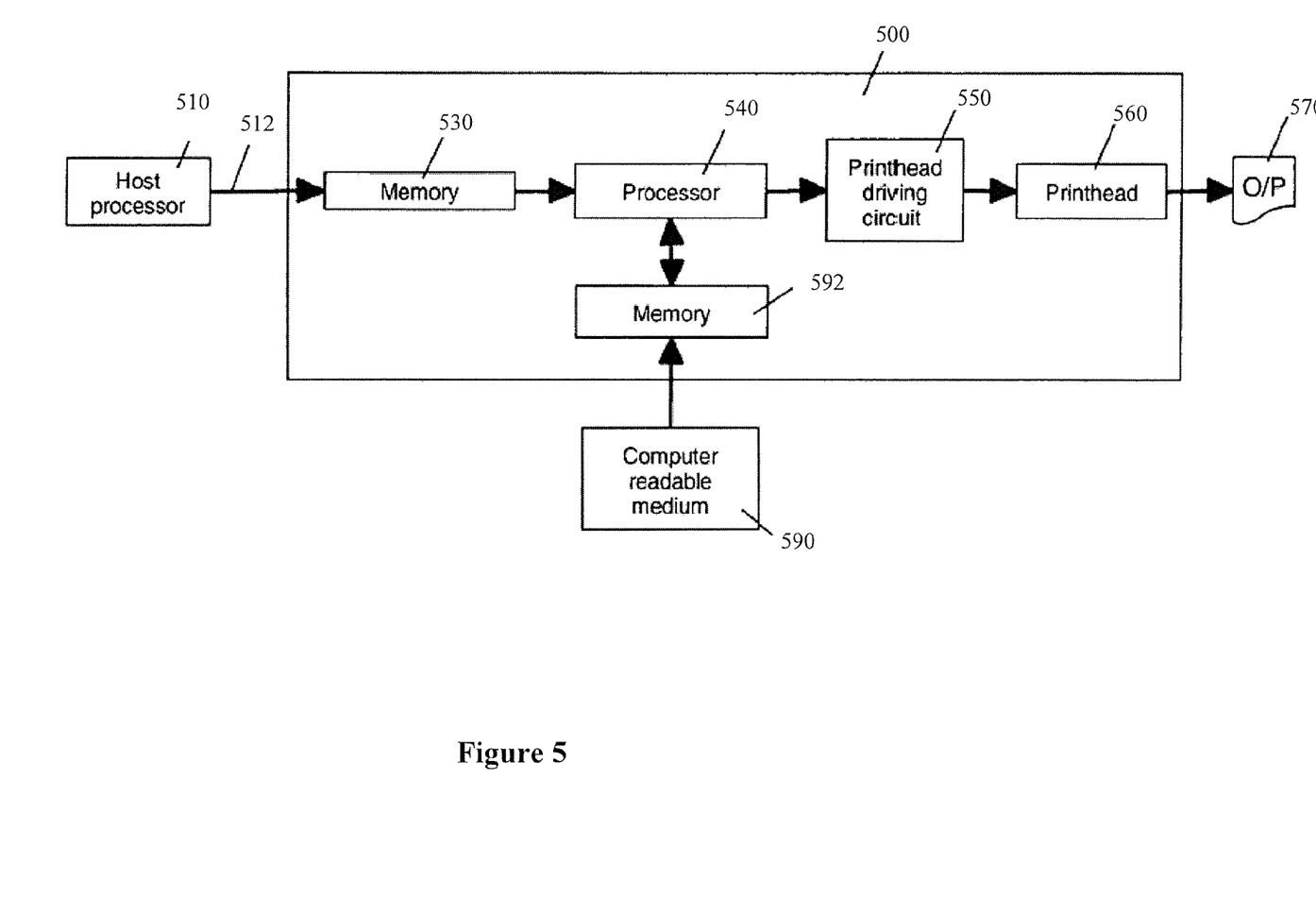
FIG. 5 illustrates one embodiment of a printer.

FIG. 5 illustrates one embodiment of a printer 500. Printer 500 receives image data 512 from a host processor 510. The image data 512 is provided into memory 530 where the image data may be arranged into 16×16 block samples. The 16×16 block samples are then processed by a processor 540, such as a raster image processor. The raster image processor 540 provides a compressed print stream representing the image data to a print head driving circuit 550. The print head driving circuit 550 then controls the print head 560 to generate a printout 570 of the image data.

The process illustrated with reference to FIGS. 2A, 2B and 3 may be tangibly embodied in a computer-readable medium/carrier 590, e.g. one or more of the fixed and/or removable data storage devices illustrated in FIG. 5, or other data storage or data communications devices. The computer program may be loaded into the memory 592 to configure the processor 540, for execution. The computer program includes instructions which, when read and executed by the processor 540, cause the processor 540 to perform the processes to execute the steps or elements of the present invention.

The computer-readable medium may include, but is not limited to, floppy diskettes, optical disks, CD-ROMs, and magneto-optical disks, ROMs, RAMs, EPROMs, EEPROMs, magnetic or optical cards, propagation media or other type of media/computer-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Figure 6:
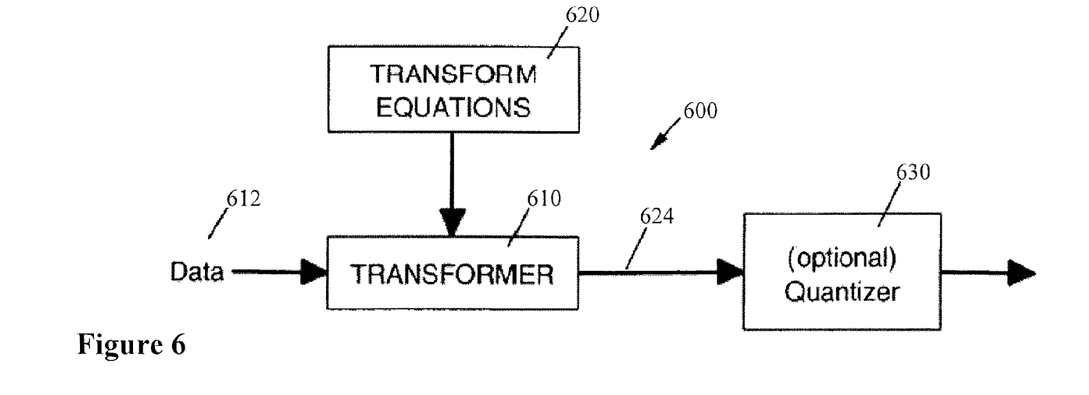
FIG. 6 illustrates one embodiment of a data analyzing system.

FIG. 6 illustrates one embodiment of a data analyzing system 600. A transformer 610 receives a block of data 612 to be analyzed. The transformer 610 uses transform equations 620 to generate transformed data 624. A transform constant in a transform equation is identified and an approximation, which is a function of an integer value and floating point value, is determined for the constant. The transform equation is then performed using the integer value in place of the constant and a result is obtained. The result is then modified using the floating point value to produce transformed data 624. The transformed data 624 may then be optionally quantized by quantizer 60, in which case modification of the result using the floating point value may be deferred for performance by the quantizer.

Figure 7:
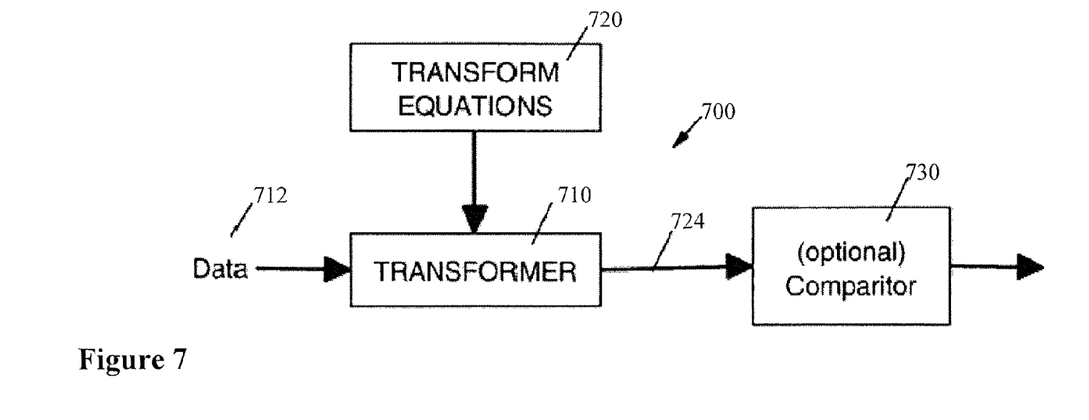
FIG. 7 illustrates another embodiment of a data analyzing system.

FIG. 7 illustrates another embodiment of a data analyzing system 700. In FIG. 7, transformer 710 receives a block of data 712 to be analyzed. The transformer 710 uses transform equations 720 to generate transformed data 724. A transform constant in a transform equation is identified and an approximation, which is a function of an integer value and floating point value, is determined for the constant. The transform equation is then performed using the integer value in place of the constant and a result is obtained. The result is then modified using the floating point value to produce transformed data 724. The transformed data 724 may then be compared to comparison values in comparator 730, in which case modification of the result using the floating point value may be deferred for performance by the comparator.

The above-described architecture provides a fixed point 1-D 16×16 DCT transform by replacing the irrational constants used in each of the rotations with integer or dyadic rational constants. In another embodiment, the architecture may be implemented without the use of multipliers (e.g., a multiplier-less implementation) by replacing each multiplication with addition operations (e.g., a number of addition operations that can be used for each approximation, as described in the third column of Tables 3-8).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A data system comprising a processor having a transformer to receive data values and perform a 1-D 16×16 discrete cosine transform (DCT) on the data values by replacing each irrational constant used in multiplication operations with a rational dyadic constant that approximates the irrational constant.

2. The system of claim 1 wherein replacing the irrational constants comprises replacing a first set of irrational constants in a second stage of the 1-D 16×16 DCT with a first set of rational dyadic constants, replacing a second set of irrational constants in a third stage of the 1-D 16×16 DCT with a second set of rational dyadic constants and replacing a third set of irrational constants in fourth and fifth stages of the 1-D 16×16 DCT with a third set of rational dyadic constants.

3. The system of claim 2 wherein each of the first set of rational dyadic constants is scaled by a first common factor, the second set of rational dyadic constants is scaled by a second common factor and the third set of rational dyadic constants is scaled by a third common factor.

4. The system of claim 3 further comprising logic to pre-compute floating point scale factors.

5. The system of claim 4 wherein the floating point scale factors computed using the common factors reduces a number of multiplication operations to be performed in the 1-D 16×16 DCT.

6. The system of claim 4 further comprising logic to convert the floating point scale factors to integer values.

7. A computer generated method comprising:
receiving data values;
performing a 1-D 16×16 discrete cosine transform (DCT) on the data values by replacing each irrational constant used in multiplication operations with a rational dyadic constant that approximates the irrational constant; and
scaling the output of the 1-D 16×16 DCT by a set of scale factors to refine precision of the approximations.

8. The method of claim 7 wherein replacing the irrational constants comprises:
replacing a first set of irrational constants in a second stage of the 1-D 16×16 DCT with a first set of rational dyadic constants;
replacing a second set of irrational constants in a third stage of the 1-D 16×16 DCT with a second set of rational dyadic constants; and
replacing a third set of irrational constants in fourth and fifth stages of the 1-D 16×16 DCT with a third set of rational dyadic constants.

9. The method of claim 8 wherein each of the first set of rational dyadic constants is scaled by a first common factor, the second set of rational dyadic constants is scaled by a second common factor and the third set of rational dyadic constants is scaled by a third common factor.

10. The method of claim 9 further comprising pre-computing floating point scale factors prior to receiving the data values.

11. The method of claim 10 further wherein the floating point scale factors are converted to fixed-point factors by multiplying the floating point scale factors with some power of two.

12. The method of claim 10 wherein the floating point scale factors are adjusted based on available processing complexity.

13. The method of claim 12 wherein the floating point scale factors are adjusted using a power of two.

14. The method of claim 10 wherein the floating point scale factors computed using the common factors reduces a number of multiplication operations to be performed in the 1-D 16×16 DCT.

15. An article of manufacture comprising a machine-readable medium including data that, when accessed by a machine, cause the machine to perform operations comprising:

receiving data values;

performing a 1-D 16×16 discrete cosine transform (DCT) on the data values by replacing each irrational constant used in multiplication operations with a rational dyadic constant that approximates the irrational constant; and scaling the output of the 1-D 16×16 DCT by a set of scale factors that refine the precision of the approximations.

16. The article of manufacture of claim 15 wherein replacing the irrational constants comprises:

replacing a first set of irrational constants in a second stage of the 1-D 16×16 DCT with a first set of rational dyadic constants;

replacing a second set of irrational constants in a third stage of the 1-D 16×16 DCT with a second set of rational dyadic constants; and replacing a third set of irrational constants in fourth and fifth stages of the 1-D 16×16 DCT with a third set of rational dyadic constants.

17. The article of manufacture of claim 16 wherein each of the first set of rational dyadic constants is scaled by a first common factor, the second set of rational dyadic constants is scaled by a second common factor and the third set of rational dyadic constants is scaled by a third common factor.

18. The article of manufacture of claim 17 comprising a machine-readable medium including data that, when accessed by a machine, further cause the machine to perform operations comprising further comprising computing floating point scale factors prior to receiving the data values.

19. The article of manufacture of claim 18 wherein the floating point scale factors computed using the third common factor reduces a number of multiplication operations to be performed in the 1-D 16×16 DCT.

20. The article of manufacture of claim 18 comprising a machine-readable medium including data that, when accessed by a machine, further cause the machine to perform operations comprising converting the floating point scale factors to integer values.

21. A printer comprising:

a transformer to receive data values and perform a 1-D 16×16 discrete cosine transform (DCT) on the data values by replacing each irrational constant used in multiplication operations with a rational dyadic constant that approximates the irrational constant.

22. The printer of claim 21 further comprising a quantizer to reduce a number of bits needed to store transformed data by reducing the precision of transformed data values.

23. The printer of claim 22 further comprising an encoder to compress values received from the quantizer.

* * * * *